(12) United States Patent
VanWiggeren et al.

(10) Patent No.: US 9,735,900 B2
(45) Date of Patent: Aug. 15, 2017

(54) HYBRID MULTIMODE NETWORK ANALYZER

(71) Applicant: Keysight Technologies, Inc., Minneapolis, MN (US)

(72) Inventors: Gregory D. VanWiggeren, San Jose, CA (US); Keith F. Anderson, Santa Rosa, CA (US); Nilesh R. Gheewala, Santa Rosa, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 14/883,490

(22) Filed: Oct. 14, 2015

(65) Prior Publication Data

US 2017/0111127 A1   Apr. 20, 2017

(51) Int. Cl.
*H04B 17/00* (2015.01)
*H04B 17/15* (2015.01)
*H04B 17/21* (2015.01)

(52) U.S. Cl.
CPC ......... *H04B 17/15* (2015.01); *H04B 17/0085* (2013.01); *H04B 17/21* (2015.01)

(58) Field of Classification Search
None
See application file for complete search history.

(56) References Cited

U.S. PATENT DOCUMENTS

| 7,801,505 | B2 | 9/2010 | VanWiggeren et al. |
| 8,841,923 | B1* | 9/2014 | Vanwiggeren ..... G01R 19/0053 324/606 |
| 2009/0216468 | A1* | 8/2009 | Anderson ............ G01R 23/165 702/57 |
| 2013/0225110 | A1* | 8/2013 | Karlquist ................. H04B 1/26 455/313 |
| 2015/0180416 | A1 | 6/2015 | Fernandez |

OTHER PUBLICATIONS

Remley et al., "Measurement Bandwidth Extension Using Multisine Signals: Propagation of Error," IEEE Transactions on Microwave Theory and Techniques, vol. 58, No. 2, Feb. 2010, pp. 458-467.

* cited by examiner

*Primary Examiner* — Alejandro Rivero

(57) ABSTRACT

Network analysis employs a band-limited multi-tone test signal having a tunable center frequency to test a device under test (DUT). A hybrid network analyzer includes a test signal source to provide the band-limited multi-tone test signal, and a local oscillator (LO) source to provide a tunable LO signal configured to track the tunable center frequency of the band-limited multi-tone test signal. The hybrid network analyzer further includes a receiver to convert into an intermediate frequency (IF) signal using the tunable LO signal one or both of the band-limited multi-tone test signal and a response signal from a device under test (DUT) produced in response to the band-limited multi-tone test signal. The test signal source is further configured to provide a tunable single-tone test signal and a broadband multi-tone test signal to test the DUT in various modes.

17 Claims, 3 Drawing Sheets

HYBRID MULTIMODE NETWORK ANALYZER

CROSS-REFERENCE TO RELATED APPLICATIONS

N/A

STATEMENT REGARDING FEDERALLY SPONSORED RESEARCH OR DEVELOPMENT

N/A

BACKGROUND

Network parameters are often used to measure, test and otherwise characterize performance of various devices and other portions of many modern electronic systems. For example, scattering parameters or 'S-parameters' are commonly employed when measuring the performance of radio frequency (RF) and microwave devices. The S-parameters of a device when measured as a function of frequency (e.g., including amplitude and phase) may be used to completely characterize the device.

A network analyzer is often used to measure network parameters such as S-parameters as a function of frequency. So-called vector network analyzers (VNAs) typically employ a stimulus or test signal to measure S-parameters of a device under test (DUT). In particular, the test signal may be applied to a port or ports of the DUT and a response to the applied test signal is then measured to determine the S-parameters. To measure S-parameters as a function of frequency, the VNA typically tunes or sweeps the test signal over a test bandwidth or test frequency range of the DUT, making measurements at a plurality of different frequencies during the sweep. Tuning the test signal and making the plurality of measurements may limit how fast a particular DUT may be characterized. However, modern VNAs typically provide S-parameters having high dynamic range and measurement precision.

A so-called 'digital network analyzer (DNA)' has been developed by Keysight Technologies, Inc. of Santa Rosa, Calif. Instead of using a tunable 'single-tone' test signal that is swept across the DUT test bandwidth, the DNA employs a broadband multi-tone test signal. As a result, the DNA may provide S-parameters as a function of frequency at a much faster rate than an equivalent VNA.

BRIEF SUMMARY

In some embodiments of the principles described herein, a hybrid network analyzer is provided. The hybrid network analyzer comprises a test signal source configured to provide a band-limited multi-tone test signal having a tunable center frequency. The hybrid network analyzer further comprises a local oscillator (LO) source configured to provide a tunable LO signal. The tunable LO signal is tunable to track the tunable center frequency of the band-limited multi-tone test signal. The hybrid network analyzer further comprises a receiver configured to convert into an intermediate frequency (IF) signal using the tunable LO signal one or both of the band-limited multi-tone test signal and a response signal from a device under test (DUT) produced in response to the band-limited multi-tone test signal. The IF signal comprises a plurality of IF tones corresponding to tones having different frequencies from one another within the band-limited multi-tone test signal.

In some embodiments of the principles described herein, a network analyzer system having multiple modes is provided. The network analyzer system comprises a radio frequency (RF) source configured to provide a tunable RF signal and a local oscillator (LO) configured to provide an LO signal tunable to track the tunable RF signal. The network analyzer system further comprises a multi-tone signal source configured to provide a broadband multi-tone signal and a narrowband multi-tone signal. The multiple modes of the network analyzer system are selectable to apply a mode-specific test signal to a device under test (DUT). The mode-specific test signal is the tunable RF signal modulated by the narrowband multi-tone signal in a first mode, the mode-specific test signal is the tunable RF signal in a second mode, and the mode-specific test signal is the broadband multi-tone signal in a third mode.

In some embodiments of the principles described herein, a method of mode-specific network analysis is provided. The method of mode-specific network analysis comprises generating a mode-specific test signal using a test source. The mode-specific test signal comprises a tunable band-limited multi-tone signal in a first mode, a tunable single-tone signal in a second mode, and a broadband multi-tone signal in a third mode. The method of mode-specific network analysis further comprises generating a mode-specific local oscillator (LO) signal using a local oscillator (LO) source. The mode-specific LO signal comprising a tunable LO signal in the first and second modes and comprising another broadband multi-tone signal in the third mode. The method of mode-specific network analysis further comprises downconverting one or both of the mode-specific test signal and a response of a device under test (DUT) to the mode-specific test signal using the generated mode-specific LO signal.

In yet other embodiments of the principles described herein, a hybrid network analyzer is provided. The hybrid network analyzer comprises a test signal source configured to provide a single-tone test signal. The single-tone test signal has a predetermined fixed frequency. The hybrid network analyzer further comprises a local oscillator (LO) source configured to provide a broadband multi-tone LO signal. The network analyzer further comprises a receiver configured to convert into an intermediate frequency (IF) signal using the broadband multi-tone LO signal one or both of the single-tone test signal and a response signal from a device under test (DUT) produced in response to the single-tone test signal.

BRIEF DESCRIPTION OF THE DRAWINGS

Various features of embodiments and examples in accordance with the principles described herein may be more readily understood with reference to the following detailed description taken in conjunction with the accompanying drawings, where like reference numerals designate like structural elements, and in which.

Figure 1:
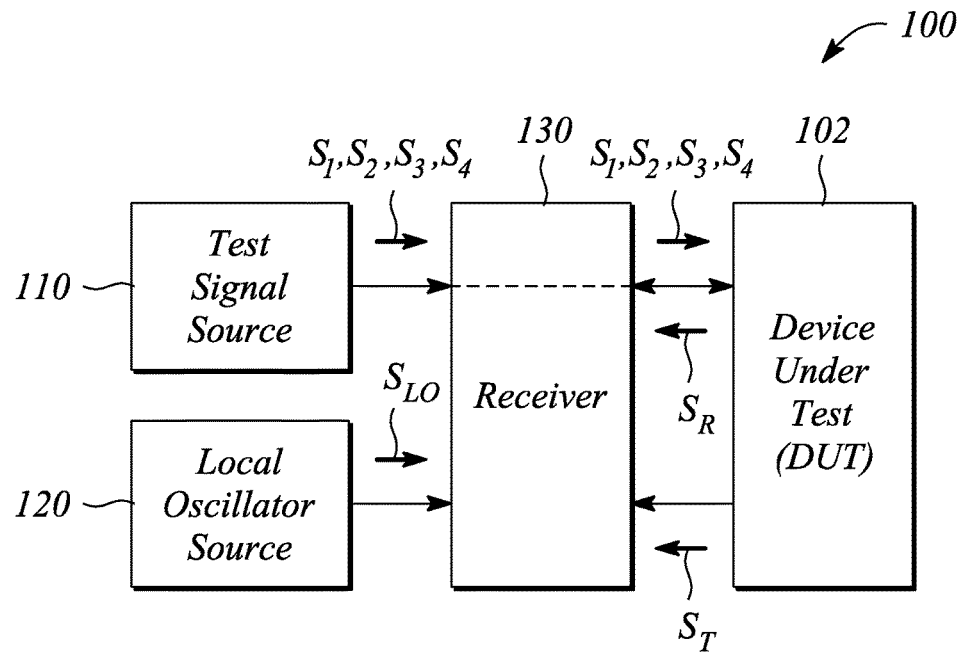
FIG. 1 illustrates a block diagram of a hybrid network analyzer in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Embodiments and examples consistent with the principles described herein provide network analysis having a plurality of modes including a narrowband or band-limited multi-tone test signal mode. In particular, hybrid or multimode network analysis according to embodiments of the principles described herein may include in a first mode, a test signal that comprises a band-limited multi-tone signal having a tunable center frequency is configured to be applied to a device under test (DUT). In the first mode, a tunable local oscillator (LO) signal configured to track the tunable center frequency of the band-limited multi-tone signal is employed in a receiver to convert one or both of the test signal and a response signal from the DUT to an intermediate frequency (IF) for analysis. The response signal may be produced at a port of the DUT in response to application of the test signal, for example. Further, according to some embodiments, hybrid or multimode network analysis may include a second mode in which the test signal comprises a tunable single-tone signal (e.g., a tunable radio frequency (RF) signal) and a third mode in which the test signal comprises a broadband multi-tone signal. In the second mode, the tunable LO signal also may be employed in IF conversion and analysis by the receiver. In the third mode, another broadband multi-tone signal may be used as an LO signal for IF conversion and analysis of the DUT. According to yet other embodiments, the hybrid or multimode network analysis may include a fourth mode in which the test signal is a single-tone signal having a predetermined fixed frequency and the LO signal is a broadband multi-tone LO signal.

According to some embodiments, the second mode of multimode network analysis may have characteristics that are substantially similar to single-tone vector network analysis, while characteristics of the third mode may be substantially similar to so-called 'digital network analysis'. For example, the second mode may be relatively slower, but provide high dynamic range, while the third mode may exhibit relatively faster test and analysis at the expense of dynamic range. However, according to the principles described herein, the first or hybrid mode may provide both relatively high dynamic range (i.e., between the dynamic ranges of the second mode and the third mode) and relatively fast test and analysis of the DUT (i.e., faster than the second mode, but slower than the third mode), according to various embodiments. Moreover, the first, second and third modes may be selectable to facilitate adapting network analysis to a particular application or situation.

Embodiments consistent with the principles described herein may be implemented using a variety of devices and circuits including, but not limited to, integrated circuits (ICs), very large scale integrated (VLSI) circuits, application specific integrated circuits (ASIC), field programmable gate arrays (FPGAs) or the like, firmware, software, or a combination of two or more of the above. For example, elements or 'blocks' of an implementation consistent with the principles described herein may all be implemented as circuit elements within an ASIC or a VLSI circuit. Implementations that employ an ASIC or a VLSI circuit are examples of hardware-based circuit implementation, for example. In another example, a portion of the apparatus may be implemented as software using a computer programming language (e.g., C/C++) or software-based modeling environment (e.g., Matlab®, MathWorks, Inc., Natick, Mass.). Implementation of the apparatus that employs software is an example of a software implementation. In yet another example, some of the blocks may be implemented using actual circuitry (e.g., as an IC or an ASIC) while other blocks may be implemented in software or firmware. The principles described herein are not limited to any one of these implementations.

Herein, a 'non-transitory computer readable medium' is defined as substantially any data storage medium that provides non-transitory storage of information that may be read, executed, or otherwise utilized by a computer or equivalent processor. Computer readable memory including, but not limited to, random access memory (RAM), read-only memory (ROM), programmable or erasable ROM or flash memory (e.g., a thumb drive) are each a non-transitory computer readable medium, by definition herein. Other non-transitory computer readable media include, but are not limited to, various types of magnetic disks and disk drives (e.g., a hard disk drive, a floppy disk drive, a floppy diskette, etc.), or various optical discs and disc drives (e.g., CD, CD-R, CD-RW, DVD, etc.), by definition herein. In addition, network attached storage, so-called 'cloud' storage (e.g., remote data storage accessible via the Internet), or various other types of computer readable media used by modern computing systems may be non-transitory computer readable media, by definition herein.

Further, as used herein, the article 'a' is intended to have its ordinary meaning in the patent arts, namely 'one or more'. For example, 'a frequency' means one or more frequencies and as such, 'the frequency' means 'the frequency(ies)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or depending on the embodiment, may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

In accordance with some embodiments of the principles described herein, a hybrid network analyzer is provided that comprises a plurality of different test modes. According to various embodiments, the hybrid network analyzer is configured to characterize a device under test (DUT) as a function of frequency. In particular, the hybrid network analyzer may be used to measure network parameters such as, but not limited to, scattering parameters or 'S-parameters' of the DUT. Further, the network parameters of the DUT may be measured using any of the plurality of different modes and employing respectively different test signals, according to various embodiments.

FIG. 1 illustrates a block diagram of a hybrid network analyzer 100 in an example, according to an embodiment consistent with the principles described herein. As illustrated in FIG. 1, the hybrid network analyzer 100 comprises a test signal source 110. The test signal source 110 is configured to provide a band-limited multi-tone test signal $S_1$ having a tunable center frequency. According to various embodiments, the hybrid network analyzer 100 may be configured to apply the band-limited multi-tone test signal $S_1$ provided by the test signal source 110 to a DUT 102. For example, application of the band-limited multi-tone test signal $S_1$ may be used to characterize the DUT 102. The band-limited multi-tone test signal $S_1$ may be applied to the DUT 102 from a test port of the hybrid network analyzer 100, for example.

In some embodiments, the band-limited multi-tone test signal $S_1$ has a bandwidth that is less than about an IF bandwidth of the hybrid network analyzer 100. In other embodiments, the bandwidth of the band-limited multi-tone test signal $S_1$ may be greater than the IF bandwidth, but less than a test bandwidth of the DUT 102. According to some embodiments, tones within the band-limited multi-tone test signal $S_1$ may be distributed in frequency substantially evenly across the bandwidth. For example, a frequency spacing between pairs of adjacent tones may be about equal from a lowest frequency to a highest frequency within the bandwidth of the band-limited multi-tone test signal $S_1$. As such, the distribution of the tones may be a substantially uniform distribution. In other examples, the band-limited multi-tone test signal $S_1$ may be characterized by a non-uniform distribution of the tones.

According to various embodiments, the band-limited multi-tone test signal $S_1$ includes a number of tones that is greater than one and that may be generally greater than two. In some embodiments, a total number of tones may be chosen arbitrarily. For example, the band-limited multi-tone test signal $S_1$ may include three tones, or four tones, or five tones, or six tones, or more. There may be a total of ten tones in the band-limited multi-tone test signal $S_1$, for example. In another example, the total number of tones may be fifty or one hundred tones or more.

According to some embodiments, the total number of tones may be dependent on a combination of the bandwidth of the band-limited multi-tone test signal $S_1$ and a target frequency resolution of the hybrid network analyzer 100. For example, a total number of tones N may be determined by dividing the bandwidth B of the band-limited multi-tone test signal $S_1$ by a frequency spacing $\Delta f$ between the tones (e.g., $N=B\div\Delta f$). Thus in this example, if the frequency spacing $\Delta f$ is ten megahertz (10 MHz) and the bandwidth B is one hundred MHz (100 MHz,), the total number of tones N may be ten (10). Note that in the example above, the frequency spacing $\Delta f$ of 10 MHz may represent (or be determined by) a 10 MHz frequency resolution of the hybrid network analyzer 100.

Figure 2:
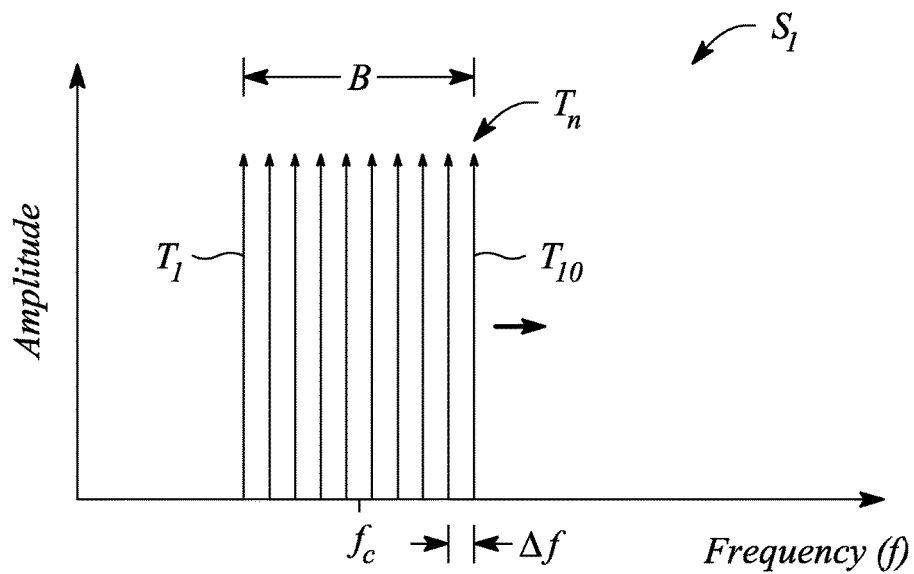
FIG. 2 illustrates a graphical representation of a band-limited multi-tone test signal in an example, according to an embodiment consistent with the principles described herein.

FIG. 2 illustrates a graphical representation of a band-limited multi-tone test signal $S_1$ in an example, according to an embodiment consistent with the principles described herein. In particular, FIG. 2 illustrates the band-limited multi-tone test signal $S_1$ as a plurality of tones $T_n$ in the frequency domain, i.e., frequency (f) vs. amplitude. In FIG. 2, each of the tones $T_n$ is represented as being a single frequency tone at a different frequency, where an index n is an integer ranging from one (1) to the total number of tones N. The total number of tones N is chosen as ten (10) in FIG. 2 for illustration purposes and not by way of limitation. Further illustrated in FIG. 2 by way of example, the band-limited multi-tone test signal $S_1$ has the bandwidth B, and the tones $T_n$ are illustrated as uniformly distributed across the bandwidth B (i.e., $\Delta f=B/10$). A bold arrow is used in FIG. 2 to illustrate tunability or tuning of the tunable center frequency $f_c$ of the band-limited multi-tone test signal $S_1$.

According to various embodiments, the test signal source 110 may be realized according to a number of different configurations. For example, the test signal source 110 may comprise a digital-to-analog converter (DAC) and the band-limited multi-tone test signal $S_1$ with a tunable center frequency $f_c$ (i.e., the 'tunable' band-limited multi-tone test signal $S_1$) may be digitally synthesized using the DAC. In another example, the tunable band-limited multi-tone test signal $S_1$ may be provided by selecting different subsets of adjacent tones from a broadband multi-tone signal having a substantially fixed center frequency. Each different adjacent-tone subset that is selected may represent a different center frequency $f_c$ of the tunable band-limited multi-tone test signal $S_1$, for example. As such, the test signal source 110 may comprise a broadband multi-tone signal source and a means for selecting (e.g., a tunable filter) the different adjacent-tone subsets to affect center frequency tuning In yet another example, the test signal source 110 may provide the tunable band-limited multi-tone test signal $S_1$ by upconverting a band-limited baseband multi-tone signal using modulation of a tunable signal.

Figure 3:
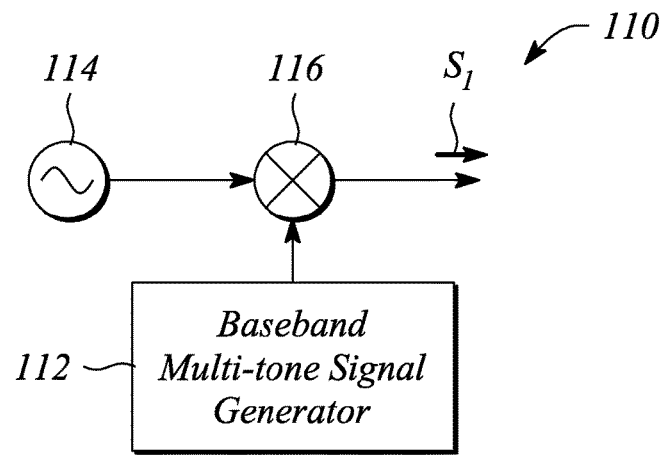
FIG. 3 illustrates a block diagram of a test signal source in an example, according to an embodiment consistent with the principles described herein.

FIG. 3 illustrates a block diagram of a test signal source 110 in an example, according to an embodiment consistent with the principles described herein. In particular, the test signal source 110 is configured to modulate a tunable signal with a band-limited baseband multi-tone signal to provide the tunable band-limited multi-tone test signal $S_1$. As illustrated in FIG. 3, the test signal source 110 comprises a baseband multi-tone signal generator 112. The baseband multi-tone signal generator 112 is configured to provide a band-limited baseband multi-tone signal having a substantially fixed center frequency. The substantially fixed center frequency may be substantially any frequency including, but not limited to, zero hertz (0 Hz), according to various embodiments.

According to some embodiments, the baseband multi-tone signal generator 112 comprises a pseudo-random binary sequence (PRBS) generator and the band-limited baseband multi-tone signal comprises a PRBS-based signal. According to various embodiments, characteristics of the band-limited baseband multi-tone signal (e.g., bandwidth as well as frequency spacing and distribution of the tones) may be controlled by selecting a PRBS used by the PRBS generator. In other embodiments, the baseband multi-tone signal generator 112 may comprise a signal generator configured to combine a plurality of sinusoidal signals to provide the band-limited baseband multi-tone signal. In these embodiments, the band-limited baseband multi-tone signal may be referred to as a band-limited baseband 'multi-sine' signal. Any of a variety of signal generators including, but not limited to, a plurality of sine wave sources or an arbitrary waveform generator may be employed to provide the band-limited baseband 'multi-sine' signal, for example. In yet other embodiments, another signal generator, signal synthesizer or combination thereof may be employed to realize the baseband multi-tone signal generator 112, any of which are within the scope described herein.

The test signal source 110 illustrated in FIG. 3 further comprises a tunable signal source 114. The tunable signal source 114 is configured to provide a tunable signal having a tunable center frequency. The tunable center frequency of the tunable signal may be equal to the tunable center frequency $f_c$ of the band-limited multi-tone test signal $S_1$, according to some embodiments. In other embodiments, tunable center frequency $f_c$ may be a function (e.g., a multiple of, harmonic of, etc.) of the tunable center frequency of the tunable signal. In some embodiments, the tunable signal source 114 may comprise a radio frequency (RF) signal generator or synthesizer and the tunable signal may be an RF signal. As such, the tunable center frequency of the band-limited multi-tone test signal $S_1$ may have a frequency in an RF range.

In other embodiments, the tunable signal source 114 may include, but is not limited to, a microwave signal generator or synthesizer, a millimeter wave signal generator or synthesizer, an infrared (IR) signal source, or optical signal source. Further, the tunable signal provided by the tunable signal source 114 may comprise a single-tone signal (e.g., a single-tone RF signal), for example. Thus, the tunable center frequency of the band-limited multi-tone test signal $S_1$ may have a frequency in a microwave frequency range, a millimeter frequency range, an IR frequency range or an optical frequency range. In yet other embodiments, the tunable signal may comprise a multi-tone signal, e.g., having two or more tones. As such, the tunable signal source 114 may comprise an arbitrary waveform synthesizer, for example.

The test signal source 110 illustrated FIG. 3 further comprises a modulator 116. The modulator 116 is configured to modulate the tunable signal with the band-limited baseband multi-tone signal to provide the band-limited multi-tone test signal $S_1$ having the tunable center frequency $f_c$. In some embodiments, the modulator 116 comprises a frequency mixer. For example, the modulator 116 may comprise an RF mixer (e.g., a diode mixer) in some embodiments, such as when the tunable signal comprises an RF signal. In another example, the modulator 116 may comprise a Gilbert cell or Gilbert cell mixer. In other embodiments, the modulator 116 may comprise or further comprise one or both of a frequency multiplier and a frequency divider. For example, the modulator 116 may comprise a Gilbert cell multiplier along with one or both of a frequency multiplier and frequency divider. As such, the modulator 116 may comprise substantially any means of modulating the tunable signal with the band-limited baseband multi-tone signal, according to various embodiments.

Referring back to FIG. 1, the hybrid network analyzer 100 further comprises a local oscillator (LO) source 120. The LO source 120 is configured to provide a tunable LO signal $S_{LO}$. In particular, the tunable LO signal $S_{LO}$ is configured to track the tunable center frequency $f_c$ of the band-limited multi-tone test signal $S_1$, according to various embodiments. By 'track' it is meant that the tunable LO signal $S_{LO}$ has a frequency having a substantially constant offset from the tunable center frequency $f_c$. In some examples, the offset or 'offset frequency' may be about equal to an intermediate frequency (IF) of the hybrid network analyzer 100. In other words, the tunable LO signal is configured to maintain a substantially constant frequency difference from the tunable center frequency $f_c$ of the band-limited multi-tone test signal $S_1$, where the frequency difference or offset frequency is about equal to the hybrid network analyzer intermediate frequency (IF).

According to various embodiments, the LO source 120 may comprise substantially any signal source that may be configured to track the tunable center frequency $f_c$ of the band-limited multi-tone test signal $S_1$. For example, the local oscillator (LO) source 120 may comprise a tunable signal generator or synthesizer. The tunable signal generator may be an RF signal generator, for example. In other examples, another tunable signal source may be used including, but not limited to, a microwave signal generator, a millimeter wave signal generator, an IR signal generator or an optical signal generator, provided the signal source is tunable.

According to various embodiments (e.g., as illustrated in FIG. 1), the hybrid network analyzer 100 further comprises a receiver 130. The receiver 130 is configured to convert one or both of the band-limited multi-tone test signal $S_1$ and a response signal from the DUT into an intermediate frequency (IF) signal. In particular, the receiver 130 is configured to convert one or both the band-limited multi-tone test signal $S_1$ and the DUT response signal using the tunable LO signal from the LO source 120. The IF signal resulting from the conversion by the receiver 130 comprises a plurality of IF tones corresponding to tones having different frequencies from one another within the band-limited multi-tone test signal $S_T$, according to various embodiments.

Figure 4:
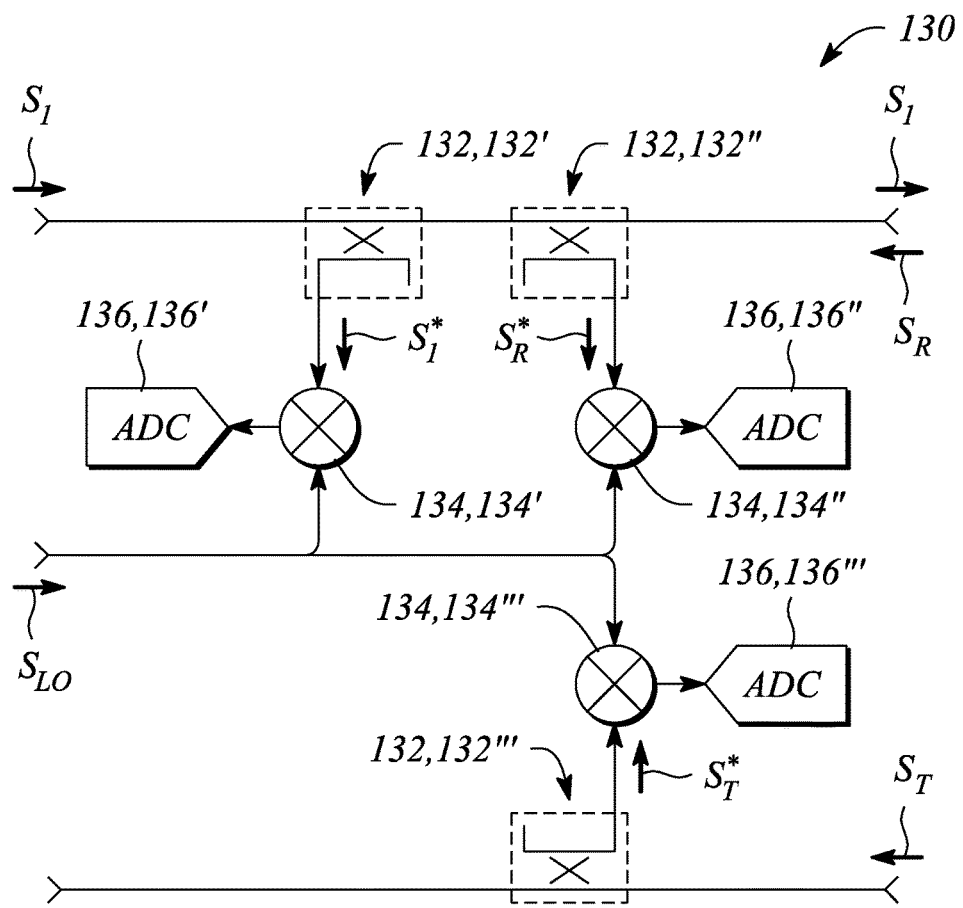
FIG. 4 illustrates a block diagram of a receiver in an example, according to an embodiment consistent with the principles described herein.

FIG. 4 illustrates a block diagram of the receiver 130 in an example, according to an embodiment consistent with the principles described herein. As illustrated in FIG. 4, the receiver 130 comprises a directional coupler 132 configured to sample a portion of a test signal. The receiver 130 further comprises a frequency mixer 134 configured to mix the test signal portion with the tunable LO signal $S_{LO}$ to produce the IF signal. As illustrated in FIG. 4, the receiver 130 further comprises an analog-to-digital converter (ADC) 136 to digitize the IF signal. According to various embodiments, the test signal portion to be sampled by the directional coupler 132 comprises one or both of the band-limited multi-tone test signal $S_1$ and the response signal from the DUT 102.

In particular, the receiver 130 illustrated in FIG. 4 comprises a first directional coupler 132' configured to sample a portion of the band-limited multi-tone test signal $S_1$ from the test signal source 110 (not illustrated in FIG. 4). The receiver 130 further comprises a second directional coupler 132" configured to sample a portion of a reflection response signal $S_R$, and a third directional coupler 132''' configured to sample a portion of a transmission response signal $S_T$. The reflection response signal $S_R$ may represent a reflection of the band-limited multi-tone test signal $S_1$ from a first port of the DUT 102 (not illustrated in FIG. 4), and the transmission response signal $S_T$ may represent a transmission of the band-limited multi-tone test signal $S_1$ through the DUT 102 from the first port to a second port thereof, for example. In FIG. 4, the sampled portions of the band-limited multi-tone test signal $S_1$, the reflection response signal $S_R$, and the transmission response signal $S_T$ are labeled $S_1^*$, $S_R^*$, and $S_T^*$, respectively.

Further, the receiver 130 illustrated in FIG. 4 comprises a first frequency mixer 134', a second frequency mixer 134", and third frequency mixer 134''' to mix respective ones of the band-limited multi-tone test signal sampled portion $S_1^*$, the reflection response signal sampled portion $S_R^*$, and the transmission response signal sampled portion $S_T^*$ with the tunable LO signal $S_{LO}$ to produce corresponding IF signals. Moreover, the receiver 130 illustrated in FIG. 4 further comprises a first ADC 136', a second ADC 136" and a third ADC 136''' to digitize the corresponding IF signals, respectively. According to some embodiments, the receiver 130 may be substantially similar to a network analyzer test set (e.g., an S-parameter test set) of a network analyzer such as, but not limited to, a PNA Network Analyzer (e.g., N5242A PNA-X Microwave Network Analyzer) manufactured by Keysight Technologies, Inc. of Santa Rosa, Calif.

Referring again to FIG. 1, according to some embodiments, the test signal source 110 may be further configured to provide a tunable single-tone test signal $S_2$. For example, the tunable signal of the tunable signal source 114, described above with respect to FIG. 3, may be employed as the tunable single-tone test signal $S_2$. The test signal source 110 may be configured to selectively provide either the band-limited multi-tone test signal $S_1$ or the tunable single-tone test signal $S_2$, according to a particular mode of the hybrid network analyzer 100, as further described below.

Further, according to some embodiments, the tunable LO signal $S_{LO}$ may be further tunable to track a frequency of the tunable single-tone test signal $S_2$. In particular, the tunable LO source 120 may be configured to track the tunable single-tone test signal $S_2$ with the tunable LO signal $S_{LO}$ in a manner substantially similar to tracking the tunable center frequency $f_c$ of the band-limited multi-tone test signal $S_1$, described above. In addition, using the tunable LO signal, the receiver 130 may be further configured to convert one or both of the tunable single-tone test signal $S_2$ and a response signal from the DUT produced in response to the tunable single-tone test signal $S_2$ into the IF signal, according to some embodiments. In particular, the receiver 130 may be substantially unchanged from that described above when employed in conjunction with the tunable single-tone test signal $S_2$.

According to some embodiments, the test signal source 110 may be further configured to provide a broadband multi-tone test signal $S_3$ having a bandwidth substantially spanning a test bandwidth of the DUT 102. For example, the test signal source 110 may comprise a broadband multi-tone signal source. The broadband multi-tone signal source may employ a PRBS-based signal, for example. When the test source 110 is configured to provide the broadband multi-tone test signal $S_3$, the LO source 120 may be further configured to provide a broadband multi-tone LO signal $S_{LO}$. For example, the LO source 120 may further comprise a broadband multi-tone signal source configured to provide the broadband multi-tone LO signal $S_{LO}$. The broadband multi-tone signal source of the LO source 120 may also employ a PRBS-based signal, for example. Moreover, using the broadband multi-tone LO signal $S_{LO}$, the receiver 130 may be further configured to convert one or both of the broadband multi-tone test signal $S_3$ and a response signal from the DUT 102 produced in response to the broadband multi-tone test signal $S_3$ into the IF signal, according to these embodiments.

In some embodiments, the test source 110 configured to provide a broadband multi-tone test signal $S_3$, the LO source 120 configured to provide a broadband multi-tone LO signal $S_{LO}$, and the receiver 130 configured to provide IF signals using the broadband multi-tone test signal $S_3$ and broadband multi-tone LO signal $S_{LO}$ may be substantially similar to corresponding elements described in one or both U.S. Pat. No. 7,801,505 B2, to VanWiggeren et al., and U.S. Patent Application Publication No. 2015/0180416 A1, to Fernandez, both of which are incorporated herein by reference in their entirety. Moreover, in such broadband multi-tone signal embodiments, the hybrid network analyzer 100 may function substantially similar to a so-called 'digital network analyzer (DNA)', described in one or both of the above-referenced VanWiggeren et al. patent and Fernandez patent application publication.

According to some embodiments, the test signal source 110 may be further configured to provide a single-tone test signal $S_4$ having a predetermined frequency. In particular, the predetermined frequency of the single-tone test signal $S_4$ may be substantially fixed. For example, the tunable signal of the tunable signal source 114, described above with respect to FIG. 3, may be tuned to the predetermined frequency to provide the single-tone test signal $S_4$ having the fixed predetermined frequency. As such, the test signal source 110 may be configured to selectively provide any one of the test signals $S_1$, $S_2$, $S_3$, and $S_4$, according to a particular mode of the hybrid network analyzer 100, as further described below.

When the test source 110 is configured to provide the single-tone test signal $S_4$, the LO source 120 may be configured to provide the broadband multi-tone LO signal $S_{LO}$. Moreover, using the broadband multi-tone LO signal $S_{LO}$, the receiver 130 may be further configured to convert one or both of the single-tone test signal $S_4$ and a response signal from the DUT 102 produced in response to the single-tone test signal $S_4$ into the IF signal, according to these embodiments.

In accordance with other embodiments of the principles described herein, a hybrid network analyzer is provided. The hybrid network analyzer comprises a test signal source configured to provide a single-tone test signal having a predetermined fixed frequency. In some embodiments, the test signal source of the hybrid network analyzer may be substantially similar to the test signal source 110 described above with respect to the hybrid network analyzer 100 and illustrated in FIG. 1. In particular, the single-tone test signal may be substantially similar to the single-tone test signal $S_4$.

Further, the hybrid network analyzer in accordance with the other embodiments further comprises a local oscillator (LO) source configured to provide a broadband multi-tone LO signal. According to some embodiments, LO source and the broadband multi-tone LO signal may be substantially similar to the LO source 120 and broadband multi-tone LO signal $S_{LO}$, respectively, as described above with respect to the hybrid network analyzer 100. In particular, the LO source of the hybrid network analyzer may include a broadband multi-tone signal source substantially similar to the broadband multi-tone signal source of the LO source 120, according to some embodiments.

The hybrid network analyzer further comprises a receiver configured to convert into an intermediate frequency (IF) signal using the broadband multi-tone LO signal one or both of the single-tone test signal and a response signal from a device under test (DUT) produced in response to the single-tone test signal. According to some embodiments, the receiver of the hybrid network analyzer may be substantially similar to the receiver 130 of the hybrid network analyzer 100, described above.

For example, according to some embodiments, the single-tone test signal may be a mode-specific test signal of the hybrid network analyzer in a fourth mode. In some embodiments, the test source of the hybrid network analyzer may be further configured to provide one or more of a band-limited multi-tone test signal having a tunable center frequency as the mode-specific test signal in a first mode, a tunable single-tone test signal as the mode-specific test signal in a second mode, and a broadband multi-tone test signal as the mode-specific test signal in a third mode. Furthermore, the LO source of the hybrid network analyzer may be further configured to provide a tunable LO signal in the first and second modes. Moreover, the receiver of the hybrid network analyzer may be further configured to use the tunable LO signal in the IF conversion in the first and second modes and the broadband multi-tone LO signal in the third mode. As such, the first, second and third modes of the hybrid network analyzer of the other embodiments are substantially similar to the first, second and third modes of the hybrid network analyzer 100, described above.

In accordance with some embodiments of the principles described herein, a network analyzer system having multiple modes is provided. According to various embodiments, the network analyzer system having multiple modes is configured characterize a device under test (DUT) as a function of frequency. In particular, the network analyzer system may be used to measure network parameters such as, but not limited to, S-parameters of the DUT in accordance with a selected mode of the multiple modes. Further, the network parameters of the DUT may be measured using mode selection between any of a plurality of different ones of the multiples modes having associated different test signals, according to various embodiments.

Figure 5:
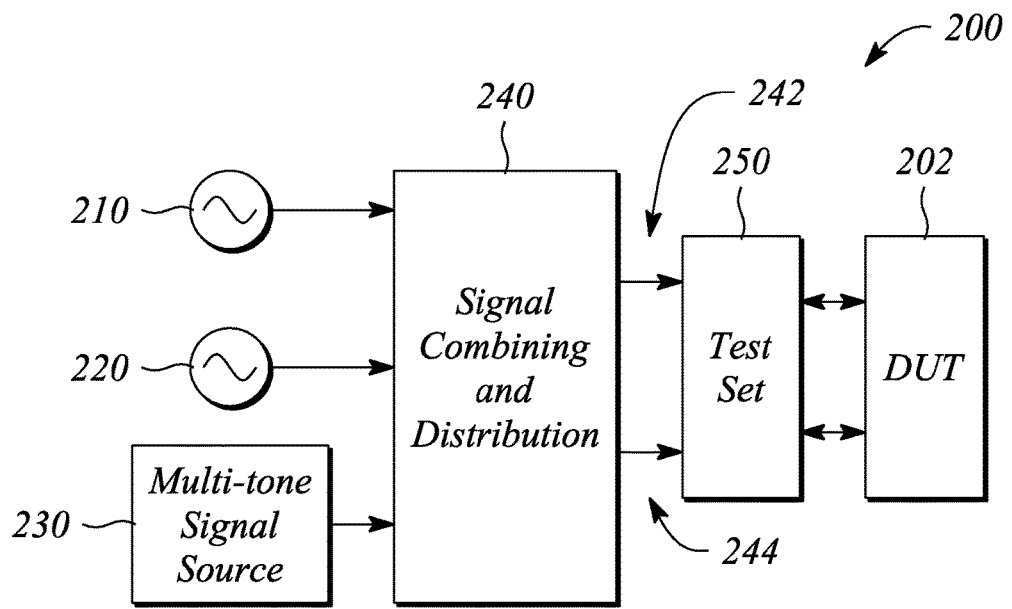
FIG. 5 illustrates a block diagram of a network analyzer system having multiple modes in an example, according to an embodiment consistent with the principles described herein.

FIG. 5 illustrates a block diagram of a network analyzer system 200 having multiple modes in an example, according to an embodiment consistent with the principles described herein. The network analyzer system 200 is configured to test a DUT 202 using a test signal that corresponds to a selected mode of the multiple modes. In particular, a mode-selected test signal is configured to be applied to the DUT 202, wherein the mode-selected test signal corresponds to the selected mode of the multiple modes of the network analyzer system 200. A response signal in conjunction with the applied, mode-selected test signal may be used to characterize the DUT 202 using one or more of the multiple modes, according to various embodiments.

As illustrated in FIG. 5, the network analyzer system 200 comprises a radio frequency (RF) source 210. The RF source 210 is configured to provide a tunable RF signal. The RF source 210 may be substantially any RF signal generator or synthesizer that is tunable across an RF band or range of frequencies. In some embodiments, the RF source 210 may be tunable across an RF range that includes a test bandwidth or test frequency range of the DUT 202, for example. In some embodiments, the RF source 210 may be substantially similar to the tunable signal source 114 described above with respect to the hybrid network analyzer 100. For example, the tunable RF signal provided by the RF source 210 may be a single-tone RF signal having a tunable frequency (e.g., tunable center frequency).

The network analyzer system 200 illustrated in FIG. 5 further comprises a local oscillator (LO) 220. The LO 220 is configured to provide an LO signal tunable to track the tunable RF signal. The LO 220 may be substantially any tunable signal generator or synthesizer that is configured to track (e.g., at an offset frequency) the tunable RF signal. In some embodiments, the LO 220 and the tunable LO signal may be substantially similar to the LO source 120 and the tunable LO signal $S_{LO}$ of the hybrid network analyzer 100, described above. For example, the tunable LO signal comprises a single-tone RF signal having a tunable frequency (e.g., tunable center frequency).

According to various embodiments (e.g., as illustrated in FIG. 5), the network analyzer system 200 further comprises a multi-tone signal source 230. The multi-tone signal source 230 is configured to provide a broadband multi-tone signal and a narrowband multi-tone signal. In some embodiments, one or more portions of the multi-tone signal source 230 may be substantially similar to one or more portions of the test signal source 110 that are configured to provide a multi-tone signal. For example, a portion of the multi-tone signal source 230 configured to provide the narrowband multi-tone signal may be substantially similar to the baseband multi-tone signal generator 112 of the test signal source 110. Further, a portion of the multi-tone signal source 230 configured to provide the broadband multi-tone signal may be substantially similar to the broadband multi-tone signal source of the test signal source 110, described above. In particular, in some embodiments, the multi-tone signal source 230 may comprise a pseudo-random binary sequence (PRBS) generator configured to synthesize one or both of the broadband multi-tone signal and the narrowband multi-tone signal from a PRBS-based signal.

According to various embodiments, the network analyzer system 200 may be configured to employ different mode-specific test signals in selected ones of the multiple modes. The different mode-specific test signals comprise different combinations of one or more of the tunable RF signal, the LO signal, the broadband multi-tone signal, and the narrowband multi-tone signal. In particular, in a first mode of the multiple modes, the mode-specific test signal may comprise the tunable RF signal modulated by the narrowband multi-tone signal. As such, the mode-specific test signal of the first mode may be substantially similar to the tunable band-limited multi-tone test signal $S_1$ described above with respect to the hybrid network analyzer 100. Further, in a second mode of the multiple modes, the mode-specific test signal may comprise the tunable RF signal itself. Thus, the second mode, mode-specific test signal may be substantially similar to the tunable single-tone test signal $S_2$ provided by the test signal source 110 of the hybrid network analyzer 100, described above. In a third mode of the multiple modes, the mode-specific test signal may comprise the broadband multi-tone signal. As such, the third mode, mode-specific test signal may be substantially similar to the broadband multi-tone test signal $S_3$ provided by the broadband multi-tone signal source of the test signal source 110, described above with respect to the hybrid network analyzer 100. In a fourth mode of the multiple modes, the mode-specific test signal may comprise the tunable RF signal tuned to a predetermined fixed frequency. As such, the fourth mode, mode-specific test signal may be a single-tone RF signal having the predetermined fixed frequency. Further, in the fourth mode, the mode-specific test signal may be substantially similar to the single-tone test signal $S_4$ provided by the test signal source 110, as described above.

In some embodiments, the broadband multi-tone signal may have a bandwidth that substantially spans a test bandwidth of the DUT 202. Further, a plurality of tones of the broadband multi-tone signal may be distributed substantially evenly across the DUT test bandwidth, according to some embodiments. In some embodiments, the narrowband multi-tone signal may have a narrowband bandwidth that is less than about an IF bandwidth of the network analyzer system 200. Further, a plurality of tones of the narrowband multi-tone signal may be distributed in frequency substantially evenly across the narrowband bandwidth, according to some embodiments.

According to some embodiments, the network analyzer system 200 may further comprise a modulator (not illustrated). The modulator is configured to modulate the tunable RF signal with the narrowband multi-tone signal to provide the test signal in the first mode. In some embodiments, the modulator may be substantially similar to the modulator 116 described above with respect to the test signal source 110 of the hybrid network analyzer 100. For example, the modulator of the network analyzer system 200 may comprise an RF frequency mixer.

According to some embodiments, the modulator may be part of a signal combining and distribution block 240 of the network analyzer system 200 illustrated in FIG. 5. In addition, the signal combining and distribution block 240 may include one or more of a switch, a multiplier, and a divider (not illustrated) to facilitate providing the various test signals of the multiple modes described above with respect to the network analyzer system 200. Further, the signal combining and distribution block 240 is configured to provide at a first output 242 a test signal associated with a selected one of the first, second or third modes of the multiple modes and at a second output 244 a corresponding local oscillator signal, as appropriate for the selected mode.

As illustrated in FIG. 5, the network analyzer system 200 further comprises a test set 250. The test set 250 is configured to provide downconversion of one or both the test signal applied to the DUT 202 and a response signal from the DUT 202. According to various embodiments, the response signal is a signal resulting from mode-specific test signal application to the DUT 202 by the network analyzer system 200. For example, the response signal may be a reflection response signal from a first port of the DUT 202 to which the mode-specific test signal is applied. In another example, the response signal may be a transmission response signal from a second port of the DUT 202 in response to application of the mode-specific test signal to the first port.

According to various embodiments, the downconversion provided by the test set 250 is to an intermediate frequency (IF) signal of the network analyzer system 200. Further, the test set 250 is configured to employ the tunable LO signal to provide the downconversion in the first and second modes. In the third and fourth modes, the test set 250 is configured to use another broadband multi-tone signal as a broadband multi-tone LO signal to provide the downconversion, according to various embodiments. Note that the other broadband multi-tone signal used by the test set 250 in the third mode downconversion is generally different from the broadband multi-tone signal of the third mode, mode-specific test signal. For example, the other broadband multi-tone signal may have a different spacing between frequencies of the various tones compared to the broadband multi-tone signal used by the test set 250. However, the multi-tone signal source 230 may be configured to provide the other broadband multi-tone signal in addition to the broadband multi-tone signal in the third mode, according to some embodiments.

Further, according to some embodiments, the test set 250 may be substantially similar to the receiver 130 of the hybrid network analyzer 100, described above. In particular, in some embodiments, the test set 250 comprises a directional coupler, an RF frequency mixer, and an analog-to-digital converter (ADC). In some embodiments, the directional coupler, the RF frequency mixer, and the ADC of the test set 250 may be substantially similar to the directional coupler 132, the frequency mixer 134 and the ADC 136, respectively, of the receiver 130.

In particular, the directional coupler of the test set 250 may be configured to sample a portion of one of the mode-specific test signal and the response signal from the DUT 202 to provide a sampled signal portion. The RF frequency mixer of the test set 250 may be configured to mix the sampled signal portion with either the tunable LO signal in the first and second modes or the other broadband multi-tone signal in the third mode to provide downconversion into the IF signal. Likewise, the ADC of the test set 250 may be configured to digitize the IF signal for later analysis by the network analyzer system 200.

Figure 6:
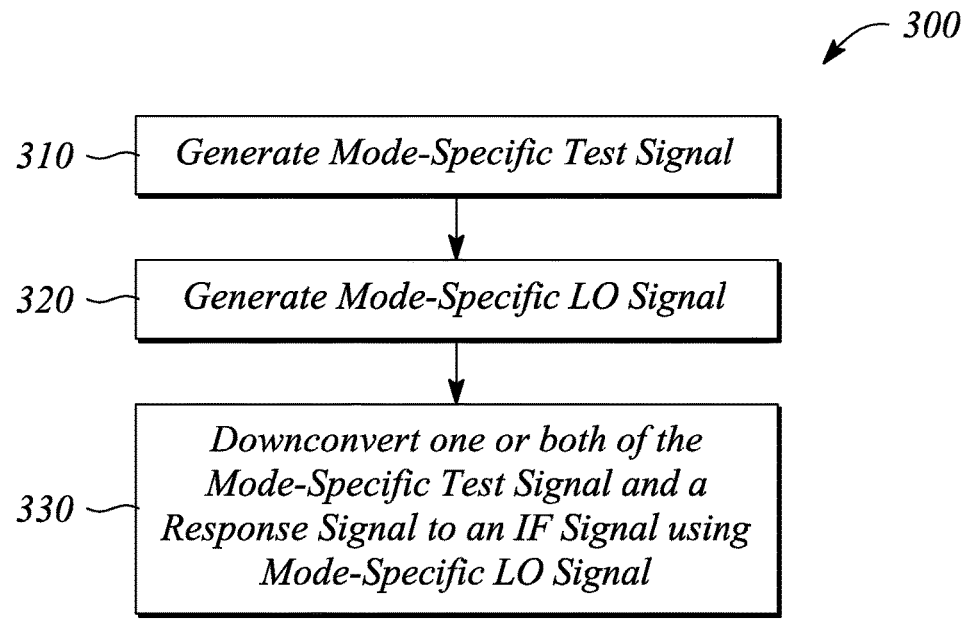
FIG. 6 illustrates a flow chart of a method of mode-specific network analysis in an example, according to an embodiment consistent with the principles described herein.

In accordance with some embodiments of the principles described herein, a method of mode-specific network analysis is provided. FIG. 6 illustrates a flow chart of a method 300 of mode-specific network analysis in an example, according to an embodiment consistent with the principles described herein. By 'mode-specific' it is meant that the provided network analysis is performed using different mode-specific test signals in different ones of a plurality of selectable modes.

As illustrated in FIG. 6, the method 300 of mode-specific network analysis comprises generating 310 a mode-specific test signal using a test source. The mode-specific test signal comprises a tunable band-limited multi-tone signal in a first mode, a tunable single-tone signal in a second mode, and a broadband multi-tone signal in a third mode, according to various embodiments. In some embodiments, the test source may be substantially similar to the test signal source 110 of the hybrid network analyzer 100, described above. Further, the mode-specific test signal may be substantially similar to the first, second and third test signals of the multiple modes described above with respect to the network analyzer system 200 having multiple modes, according to some embodiments.

The method 300 of mode-specific network analysis illustrated in FIG. 6 further comprises generating 320 a mode-specific local oscillator (LO) signal using a local oscillator (LO) source. The mode-specific LO signal comprises a tunable LO signal in the first and second modes and comprises another broadband multi-tone signal in the third mode. In some embodiments, the LO source may be substantially similar to the LO source 120 of the hybrid network analyzer 100, described above. Further, according to some embodiments, the mode-specific LO signal of the first and second modes may be substantially similar to the tunable LO signal, and the other broadband multi-tone signal in the third mode may be substantially similar to the other broadband multi-tone signal of the third mode of the network analyzer system 200 having multiple modes, described above.

According to various embodiments (e.g., as illustrated in FIG. 6), the method 300 of mode-specific network analysis further comprises downconverting 330 one or both of the mode-specific test signal and a response of a device under test (DUT) to the mode-specific test signal using the generated mode-specific LO signal. Downconverting 330 may produce an intermediate frequency (IF) signal that represents one or both of the mode-specific test signal and the response of the DUT, according to various embodiments. In some embodiments, downconverting 330 may be provided by a test set substantially similar to the test set 250 described above with respect to the network analyzer system 200. Further, a receiver substantially similar to the receiver 130 of the hybrid network analyzer 100 may be employed to provide downconverting 330, in some embodiments. In some embodiments (not illustrated), the method 300 of mode-specific network analysis further comprises applying the mode-specific test signal to the DUT.

Thus, there have been described examples and embodiments of a hybrid network analyzer, a network analyzer system having multiple modes, and a method of mode-specific network analysis that employ a plurality of different test signals including a tunable band-limited multi-tone test signal or a tunable narrowband multi-tone test signal. It should be understood that the above-described examples are merely illustrative of some of the many specific embodiments and examples that represent the principles described herein. Clearly, those skilled in the art can readily devise numerous other arrangements without departing from the scope as defined by the following claims.

What is claimed is:

1. A hybrid network analyzer comprising:
a test signal source configured to provide a band-limited multi-tone test signal having a tunable center frequency;
a local oscillator (LO) source configured to provide a tunable LO signal, the tunable LO signal being tunable to track the tunable center frequency of the band-limited multi-tone test signal; and
a receiver configured to convert into an intermediate frequency (IF) signal using the tunable LO signal one or both of the band-limited multi-tone test signal and a response signal from a device under test (DUT) produced in response to the band-limited multi-tone test signal, the IF signal comprising a plurality of IF tones corresponding to tones having different frequencies from one another within the band-limited multi-tone test signal, wherein:
the test signal source is further configured to provide a broadband multi-tone test signal having a bandwidth substantially spanning a test bandwidth of the DUT, and
wherein the LO source is further configured to provide a broadband multi-tone LO signal, and wherein the receiver is further configured to convert into the IF signal using the broadband multi-tone LO signal one or both of the broadband multi-tone test signal and a response signal from the DUT produced in response to the broadband multi-tone test signal; or
the test signal source is further configured to provide a single-tone test signal having a predetermined fixed frequency, the LO source being further configured to provide a broadband multi-tone LO signal, and wherein the receiver is further configured to convert into the IF signal using the broadband multi-tone LO signal one or both of the single-tone test signal and a response signal from the DUT produced in response to the single-tone test signal.

2. The hybrid network analyzer of claim 1, wherein the band-limited multi-tone test signal has a bandwidth that is less than about an IF bandwidth of the hybrid network analyzer, tones within the band-limited multi-tone test signal being distributed in frequency substantially evenly across the bandwidth.

3. The hybrid network analyzer of claim 1, wherein the band-limited multi-tone test signal has at least three tones.

4. The hybrid network analyzer of claim 1, wherein the test signal source comprises:
a baseband multi-tone signal generator configured to provide a band-limited baseband multi-tone signal having a substantially fixed center frequency;
a tunable signal source configured to provide a tunable signal, the tunable signal having a tunable center frequency; and
a modulator configured to modulate the tunable signal with the band-limited baseband multi-tone signal to provide the band-limited multi-tone test signal.

5. The hybrid network analyzer of claim 4, wherein the baseband multi-tone signal generator comprises a pseudo-random binary sequence (PRBS) generator, the band-limited baseband multi-tone signal comprising a PRBS-based signal.

6. The hybrid network analyzer of claim 4, wherein the modulator comprises a frequency mixer.

7. The hybrid network analyzer of claim 1, wherein the receiver comprises:
a directional coupler configured to sample a portion of a test signal;
a frequency mixer configured to mix the test signal portion with the tunable LO signal to produce the IF signal; and
an analog-to-digital converter to digitize the IF signal,
wherein the test signal portion to be sampled by the directional coupler comprises one or both of the band-limited multi-tone test signal and the response signal from the DUT.

8. The hybrid network analyzer of claim 1, wherein the tunable center frequency of the band-limited multi-tone test signal has a frequency in a radio frequency (RF) range.

9. The hybrid network analyzer of claim 1, wherein the test signal source is further configured to provide a tunable single-tone test signal, and wherein the tunable LO signal is further tunable to track a frequency of the tunable single-tone test signal, and wherein the receiver is further configured to convert into the IF signal using the tunable LO signal one or both of the tunable single-tone test signal and a response signal from the DUT produced in response to the tunable single-tone test signal.

10. A network analyzer system having multiple modes, the network analyzer system comprising:
a radio frequency (RF) source configured to provide a tunable RF signal;
a local oscillator (LO) configured to provide an LO signal tunable to track the tunable RF signal; and
a multi-tone signal source configured to provide a broadband multi-tone signal and a narrowband multi-tone signal;
wherein the multiple modes of the network analyzer system are selectable to apply a mode-specific test signal to a device under test (DUT), the mode-specific test signal being the tunable RF signal modulated by the narrowband multi-tone signal in a first mode, the mode-specific test signal being the tunable RF signal in a second mode, and the mode-specific test signal being the broadband multi-tone signal in a third mode; and
a test set configured to provide downconversion of one or both of the mode-specific test signal applied to the DUT and a response signal from the DUT resulting from the mode-specific test signal application, the downconversion being to an intermediate frequency (IF) signal of the network analyzer system, wherein the test set is configured to employ the tunable LO signal to provide the downconversion in the first and second modes, the test set being configured to use another broadband multi-tone signal as a broadband multi-tone LO signal to provide the downconversion in the third mode.

11. The network analyzer system of claim 10, wherein the broadband multi-tone signal has a bandwidth that substantially spans a test bandwidth of the DUT, a plurality of tones of the broadband multi-tone signal being distributed substantially evenly across the DUT test bandwidth.

12. The network analyzer system of claim 10, wherein the narrowband multi-tone signal has a narrowband bandwidth that is less than about an IF bandwidth of the network analyzer system, a plurality of tones of the narrowband multi-tone signal being distributed in frequency substantially evenly across the narrowband bandwidth.

13. The network analyzer system of claim 10, wherein the multi-tone signal source comprises a pseudo-random binary sequence (PRBS) generator configured to synthesize one or both of the broadband multi-tone signal and the narrowband multi-tone signal from a PRBS-based signal.

14. The network analyzer system of claim 10, further comprising a modulator configured to modulate the tunable RF signal with the narrowband multi-tone signal to provide the mode-specific test signal in the first mode.

15. The network analyzer system of claim 10, wherein the test set comprises:
a directional coupler configured to sample a portion of one of the mode-specific test signal and the response signal from the DUT to provide a sampled signal;
an RF frequency mixer configured to mix the sampled signal with either the tunable LO signal in the first and second modes or the other broadband multi-tone signal in the third mode to provide downconversion into the IF signal; and
an analog-to-digital converter to digitize the IF signal.

16. The network analyzer system of claim 10, wherein the RF source is further configured to provide a single-tone RF signal having a predetermined fixed frequency, the mode-specific test signal being the single-tone RF signal in a fourth mode, and wherein the network analyzer system further comprises a test set configured to provide downconversion of one or both of the mode-specific test signal applied to the DUT and a response signal from the DUT resulting from the mode-specific test signal application in the fourth mode, the downconversion being to an intermediate frequency (IF) signal of the network analyzer system, the test set being configured to use another broadband multi-tone signal as a broadband multi-tone LO signal to provide the downconversion in the fourth mode.

17. A hybrid network analyzer comprising:
a test signal source configured to provide a single-tone test signal, the single-tone test signal having a predetermined fixed frequency;
a local oscillator (LO) source configured to provide a broadband multi-tone LO signal; and
a receiver configured to convert into an intermediate frequency (IF) signal using the broadband multi-tone LO signal one or both of the single-tone test signal and a response signal from a device under test (DUT) produced in response to the single-tone test signal, wherein the single-tone test signal having the predetermined fixed frequency is a mode-specific test signal of the hybrid network analyzer in a fourth mode, the test source being further configured to provide one or more of a band-limited multi-tone test signal having a tunable center frequency as the mode-specific test signal in a first mode, a tunable single-tone test signal as the mode-specific test signal in a second mode, and a broadband multi-tone test signal as the mode-specific test signal in a third mode, and
wherein the LO source is further configured to provide a tunable LO signal in the first and second modes, and
wherein the receiver is further configured to use the tunable LO signal in the IF conversion in the first and second modes and the broadband multi-tone LO signal in the third mode.

* * * * *